United States Patent
Padula et al.

(10) Patent No.: US 8,401,152 B2
(45) Date of Patent: Mar. 19, 2013

(54) METHOD AND SYSTEM FOR PERFORMING EMTA LOOP DIAGNOSTICS

(75) Inventors: Richard A. Padula, Suwanee, GA (US); Bill Mohr, Cumming, GA (US)

(73) Assignee: ARRIS Group, Inc., Suwanee, GA (US)

( * ) Notice: Subject to any disclaimer, the term of this patent is extended or adjusted under 35 U.S.C. 154(b) by 1322 days.

(21) Appl. No.: 11/695,923

(22) Filed: Apr. 3, 2007

(65) Prior Publication Data

US 2008/0043633 A1 Feb. 21, 2008

Related U.S. Application Data

(60) Provisional application No. 60/788,765, filed on Apr. 3, 2006.

(51) Int. Cl.
H04M 1/24 (2006.01)
H04M 3/08 (2006.01)
H04M 3/22 (2006.01)

(52) U.S. Cl. ............... 379/1.01; 379/9.04; 379/27.01; 379/29.01; 379/29.1; 370/241; 370/248

(58) Field of Classification Search .......... 379/1.01, 379/9, 9.06, 10.01, 10.03, 15.01, 24, 26.01, 379/26.02, 27.01, 27.04, 29.01, 29.09, 29.11, 379/9.04, 12, 15.03, 15.05, 29.1; 370/241, 370/241.1, 248, 251, 252, 352

See application file for complete search history.

(56) References Cited

U.S. PATENT DOCUMENTS

| 6,014,425 | A  | * | 1/2000 | Bingel et al. | 379/26.02 |
| 7,587,028 | B1 | * | 9/2009 | Broerman et al. | 379/15.03 |
| 7,933,295 | B2 | * | 4/2011 | Thi et al. | 370/493 |
| 2003/0145075 | A1 | * | 7/2003 | Weaver et al. | 709/223 |
| 2007/0162556 | A1 | * | 7/2007 | Ho et al. | 709/208 |
| 2008/0031143 | A1 | * | 2/2008 | Ostrosky | 370/242 |
| 2009/0282453 | A1 | * | 11/2009 | Bowen et al. | 725/129 |
| 2010/0008264 | A1 | * | 1/2010 | Ellis et al. | 370/259 |
| 2010/0191525 | A1 | * | 7/2010 | Rabenko et al. | 704/211 |

* cited by examiner

*Primary Examiner* — Binh Tieu
(74) *Attorney, Agent, or Firm* — Troy A. Van Aacken; Robert J. Starr

(57) ABSTRACT

Diagnostic testing of a telephony line card device and corresponding line card is initiated using an initiation MIB. Responding to an instruction from a main processor that a query has determined that an initiation MID is Set, line card processor circuitry begins a predetermined series of diagnostic testing. Results for the diagnostic testing are stored in a register coupled to the line card processor circuitry. After testing completes, the main processor, which is coupled to the line card processor, retrieves the results information from the line card register, converts the information to one or more results MIB(s) and stores the results MIB(s) as an instance(s) to a memory coupled to the main processor. The result MIB instance(s) is/are made available to a local or remote device via port coupled to the line card device. A permissive MIB may be queried to determine whether diagnostic testing is permitted.

11 Claims, 2 Drawing Sheets

METHOD AND SYSTEM FOR PERFORMING EMTA LOOP DIAGNOSTICS

CROSS REFERENCE TO RELATED APPLICATION

This application claims the benefit of priority under 35 U.S.C. 119(e) to the filing date of Padula, et al., U.S. provisional patent appliaction No. 60/788,765 entitled "Loop diagnostic for cable EMTAs," which was filed Apr. 3, 2006, and is incorporated herein by reference in its entirety.

FIELD OF THE INVENTION

This invention relates, generally, to communication networks and, more particularly, to performing loop diagnostics at an EMTA device.

BACKGROUND

Currently, broadband networks may be used to provide traditional telephony service over community antenna television ("CATV") or other communications networks using coaxial cable ("coax") or optical fiber cable. For example, ARRIS Group, Inc. offers telephony over cable products known as VOICE PORT® and TOUCHSTONE® cable modems which interface a media terminal adaptor ("MTA"), or an embedded media terminal adaptor ("EMTA"), with a data network. Unlike traditional telephone systems, which typically consist of a central unit with banks of line cards resident within the central unit, EMTA devices are widely distributed geographically at customers' premises. Each EMTA must operate as a largely autonomous network element for the purpose of network administration and maintenance.

Within traditional telephony systems, maintenance tools have been developed that allow network operators to remotely diagnose issues with telephony line cards, and with the external loops that connect the line cards with the end users. These tools are commonly referred to as line diagnostics, or line and loop diagnostics. The EMTA population has not had access to these tools because of the radically different network control architecture via-à-vis a traditional telephony network system. Traditional line and loop test systems relied upon a centralized controller and proprietary massaging systems to initiate tests and report results. Thus, there is a need in the art for a method and system for facilitating remote initiation and evaluation of line and loop diagnostic testing of line cards and their corresponding loops at EMTA devices that are deployed at customer premises.

SUMMARY

Independent EMTA systems are provided with a method and system to initiate line and loop tests and report result. The new system makes use of management information base ("MIB") technology to allow a user to initiate diagnostic testing trough the use of a simple network management protocol ("SNMP") MIB set, and retrieve the results, stored in one or more results MIBs, at a later time through the use of an SNMP MIB walk.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
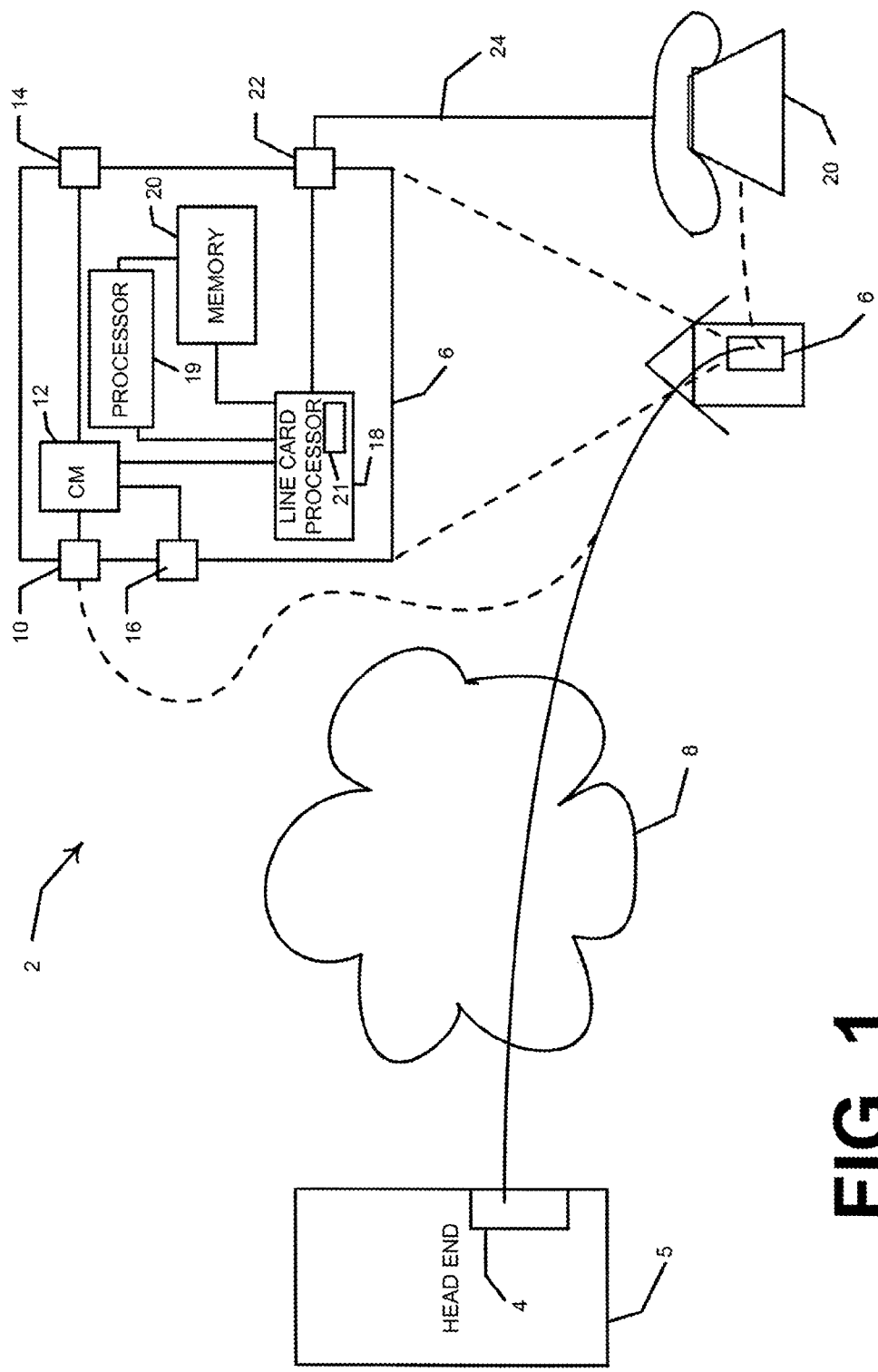
FIG. 1 illustrates a network diagram for performing loop diagnostics.

Turning now to the figures, FIG. 1 illustrates a network diagram showing a system 2 for performing loop diagnostics. Equipment at a service provider's central location, such as a cable modem termination system ("CMTS") 4 at the head end 5 of a cable provider ("MSO"), couples to a subscriber's user device, such as an embedded media terminal device ("EMTA") 6 via a network 8, such as a hybrid fiber coaxial ("HFC") network. As known in the art, an EMTA device 6 typically couples to HFC 8 at an radio frequency ("RF") port 10. RF port 10 interfaces with cable modem circuitry 12, which may interface with a user device, such as a computer, via Ethernet port 14 or USB port 16. Voice data that circuitry 12 receives or transmits is sent to, or received from, line card processing circuitry 18.

Memory 20 is coupled to, and shared by, line card processor 18 and main processor 19. Processor 19 typically interfaces with, and exerts control over, cable modem ("CM") circuitry 12, line card circuitry 18 and memory 20. Memory 20 can typically comprise multiple logical sections, or blocks, as known in the art. Thus, CM circuitry 12 may store information data it processes in one section, or block, of memory 20, and line card processing circuitry 18 may store information data it processes in another. It will be appreciated that line card circuitry 18 typically includes a Subscriber Line Access Controller ("SLAC") and a Subscriber Line Interface Controller ("SLIC"). The SLAC typically includes a DSP for performing various operations, including compression algorithms, A/D-D/A conversions, etc. The SLAC processor typically can access a register 21 that is usually part of the SLAC. The SLIC interfaces signals transmitted to and received from the Tip and Ring contacts of port 22.

As known in the art, line card processor 18 is typically used to interface voice data transmitted over HFC 8 using a communication protocol, such as, for example, Internet Protocol, with a traditional telephony handset device, or other device such as a facsimile machine, that is designed to interface with a traditional plain old telephony service ("POTS") network. A traditional telephony device 20 typically couples to line card processing circuitry 18 via port 22, such as RJ-11 jack, for example.

For device management purposes, management information base ("MIB") information can be received via a download from head end 5, via a transfer through ports 14 and 16, or may be embedded into EMTA device 6 when it is manufactured. As known in the art, an MIB comprises objects that are used to store information. The information stored in a given object at a given time is typically referred to as an instance. MIB instances are typically accessed and manipulated using simple network management protocol ("SNMP"), and can be used to provide status of a device that is managed using MIBs.

The structure of an MIB typically conforms to standards agreed to by an Internet standards body. However, the standard allows customized, private uses of MIB objects. These are not defined by a standards body, except to the extend that the addressing of a private MIB object should conform to a standard address naming of MIB objects generally. Thus, a standards body assigns the address of a given ode of the MIB to a particular manufacturer, for example. The manufacturer can then create its own custom MIB objects that branch from its corresponding manufacturer node. The manufacturer can use MIBs it creates for its own purposes. Typically, some of a manufacturer's MIBs are kept private by the manufacturer and some are known to the public so the other's devices can interoperate with the manufacturer's devices.

As discussed above, line card processor 17 provides an interface between information that passes back and forth between CM circuitry 12 and the typically analog traditional telephony equipment 20. As discussed above, the SLIC of line card processor 18 has circuitry capable of producing the voltages used in POTS systems. The ability of generate voltages can be used to perform diagnostic testing of various parameters of the loop circuitry 24, as well as SLIC itself. If an initiation MIB instance is set to a predetermined value, diagnostic testing commences in response to the initiation MIB instance value. For example, if telephony device 20 is 'on-hook', the AV voltage between the tip and ground of loop 24 should be zero. If an AC voltage of greater than 10 V is detected at either the tip or ring with respect to ground, line card processor 18 generates an indication that the voltage is high, which corresponds to a fail condition. Result information indicating the fail condition may be then stored in register 21. The result information may then be stored to a custom result MIB object as an instance of that object. The particular custom object would be used only for the storing of a high AC voltage pass/fail indication instance. Then, according to SNMP, a Get, GetNext, or GetBulk message from a network managing station ("NMS"), sometimes referred to as a console, can retrieve the instance in the custom object and report the pass or fail result of the loop diagnostic testing to a location remote from the managed device, which in the figure is EMTA device 6.

It will be appreciated that the MIB object that stores the diagnostic instance may be stored in a portion of memory 20 reserved for storing diagnostic information. Furthermore, inputting of a command line interface command via a device coupled to USB port 16 can also be used to retrieve diagnostic testing results stored in register 21 without using SNMP.

Figure 2:
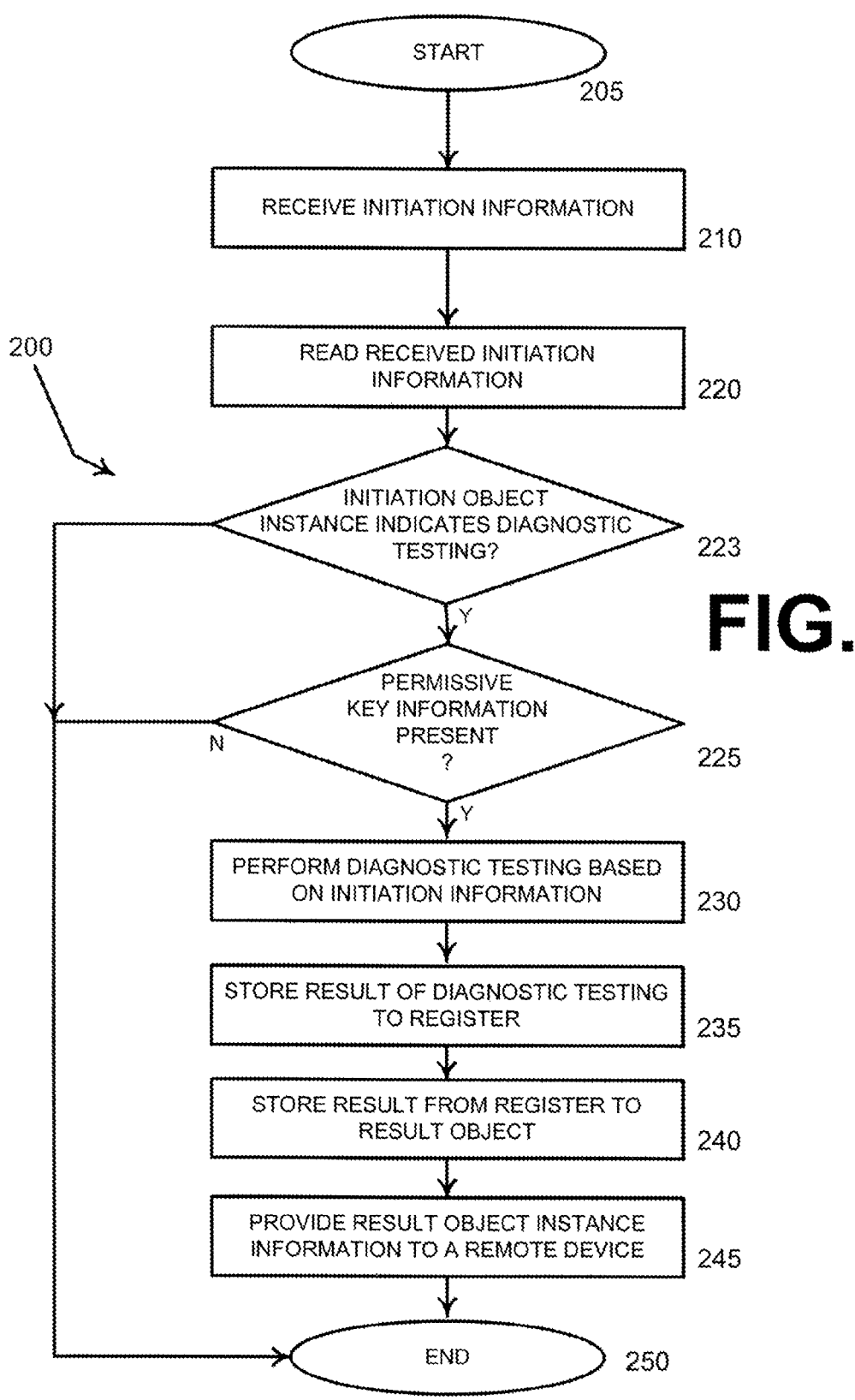
FIG. 2 illustrates a flow diagram of a method for performing loop diagnostics.

Turning now to FIG. 2, a flow diagram of a method 200 for performing line card and loop diagnostic testing is shown. Method 200 starts at step 205. At step 210, initiation information is received. The initiation information may be a Set message received via SNMP. The initiation message may be received during an interrupt and is a value stored to an initiation object, typically stored to an MIB object as an instance that indicates whether diagnostic testing is to commence. At step 220, in response to sensing an interrupt for example, information is read from the initiation object. At step 223, a determination is made whether information read from the initiation object indicates that diagnostic testing is to commence—it is possible that during an interrupt the initiation object was cleared to prevent diagnostic testing. If method 200 determines at step 224 that it is to cause diagnostic testing to occur, an evaluation may be made at step 225 to determine whether permissive key information is present. Presence of a permissive key would exist when information in a permissive key object, typically an MIB object instance, is Set. If method 200 determines at step 225 that a permissive key is present and Set, then the method advances to step 230. At step 230, diagnostic testing is performed. If the determination made at either steps 223 or 225 is no ("N"), method advances to step 250 and ends.

The diagnostic testing performed at step 230 may include a number of different tests. Some examples of diagnostic tests that may be performed include hazardous potential test, foreign electromotive force test, resistive faults test, receiver-off-hook test, and ringers test, among others. Prior to testing, MIB objects are set to a value that indicates 'Not Started.' When testing begins, the MIBs contain a value that indicates 'In Progress.' When a given test is complete, method 200 sets the corresponding MIB object to a value that indicates either 'Pass' or 'Fail.' For example, if method 200 is causing a ringer test to be conducted, a value indicating 'Fail' may be Set to the ringer test MIB object instance if no telephony devices are coupled to the loop being tested.

After diagnostic testing performed during step 230 is complete, results are typically stored at step 235 to a register that is coupled to, and often part of, the SLAC. If multiple tests are performed, the result of each test is typically stored to a different portion of the SLAC register. At step 240, the result information stored in the SLAC register(s), is stored to corresponding result MIB instances. For example, the result of the ringer test described above would be stored to a ringer testing result MIB object instance at step 240. At step 245, the result MIB object instances are made available to a remote device, for example, a device that sent initiation information that started method 200 at step 210. The providing of result MIB instances may be made by sending a message to the remote device instructing it to send one or more Get messages via SNMP to the result MIBs. Retrieving multiple related MIB instances is sometimes referred to in the art as 'walking the MIB.' After walking the MIB, method 200 ends at step 250.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A system for performing line and diagnostic testing in an EMTA device comprising:
   processor circuitry for performing diagnostic testing on subscriber telephone wiring and equipment based on an initiation object instance initiated from a remote service operator;
   first memory coupled to the processor circuitry for storing the initiation object instance;
   second memory coupled to the processor circuitry for storing result information that corresponds to the results of the diagnostic testing on the subscriber telephone wiring and equipment; and third memory coupled to the processor circuitry for storing the result information in a result object instance, wherein the contents of the result object being available to the remote service operator.

2. The system of claim 1 wherein the first and third memories are separate portions of a physical memory.

3. The system of claim 1 wherein the initiation object and result object are management information base objects.

4. The system of claim 1 wherein the second memory is a separate memory from the first and third memories.

5. A method for performing diagnostics of a loop coupled to an EMTA device, comprising:
   reading initiation information in an initiation object initiated from a remote service operator;
   performing diagnostic testing on subscriber telephone wiring and equipment according to the initiation information;
   storing result information corresponding to results of the diagnostic testing to a register; and
   storing the result information to a result object, the contents of the result object being available to the remote service operator.

6. The method of claim 5 further comprising querying a permissive key object to determine whether performing diagnostic testing is enabled.

7. The method of claim 5 wherein the initiation object is a MIB object.

8. The method of claim 5 wherein the result object is a MIB object.

9. The method of claim 7 wherein the initiation information is stored as a MIB instance.

10. The method of claim 9 wherein the initiation information is transmitted from a device remote from the EMTA device.

11. The method of claim 8 wherein the result information is stored as a MIB instance.

* * * * *